No. 762,282. PATENTED JUNE 14, 1904.
M. CORRINGTON.
FLUID PRESSURE BRAKE APPARATUS.
APPLICATION FILED SEPT. 28, 1903.
NO MODEL. 4 SHEETS—SHEET 1.
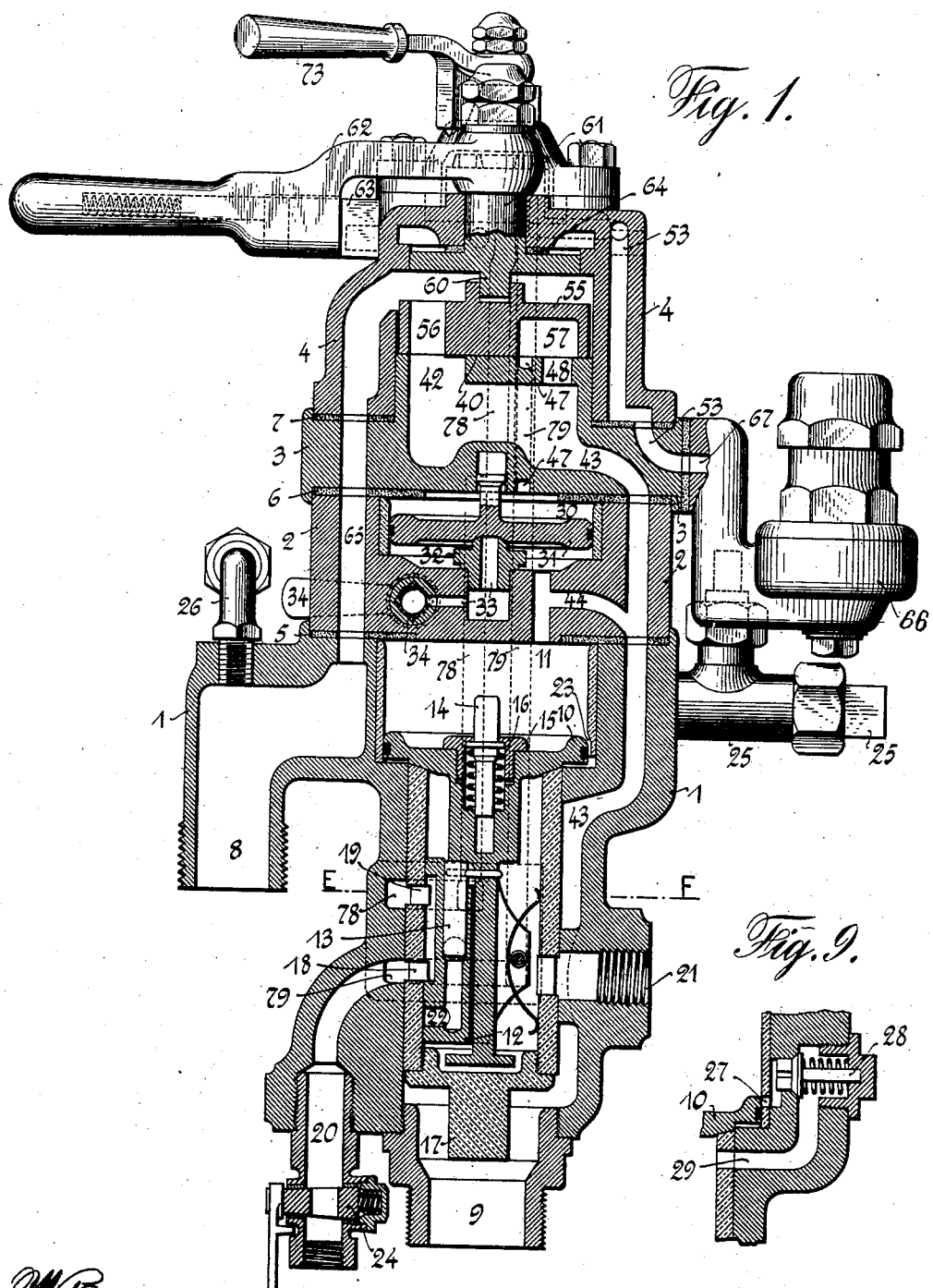
Witnesses
Max B. A. Doring
M. C. Skelley.
Inventor
Murray Corrington No. 762,282. PATENTED JUNE 14, 1904.
M. CORRINGTON.
FLUID PRESSURE BRAKE APPARATUS.
APPLICATION FILED SEPT. 28, 1903.
NO MODEL. 4 SHEETS—SHEET 2.
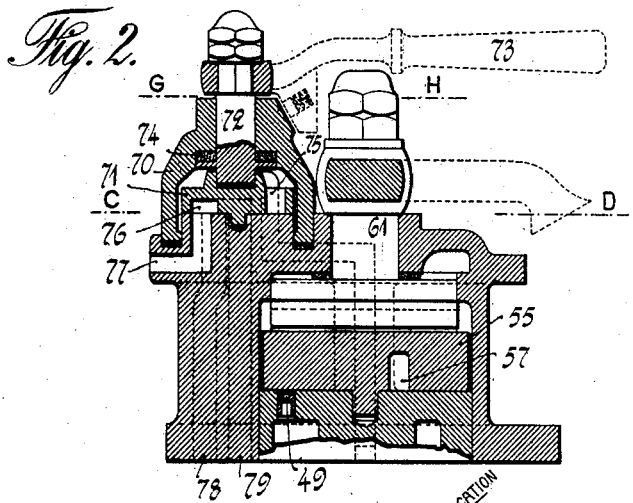
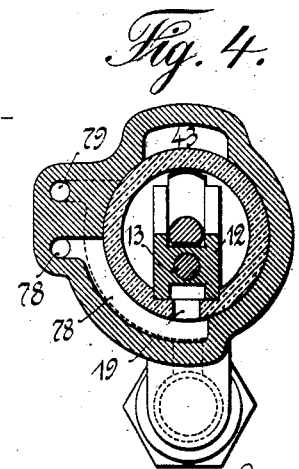
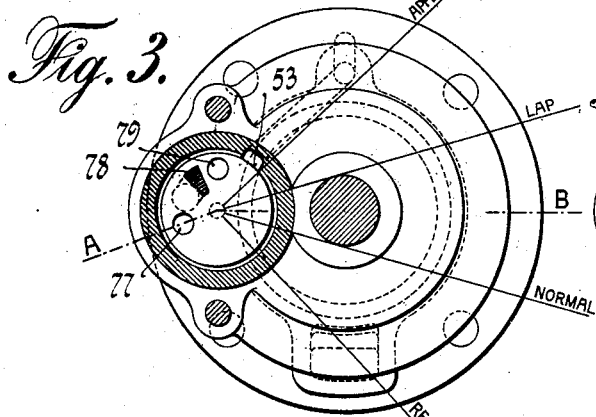
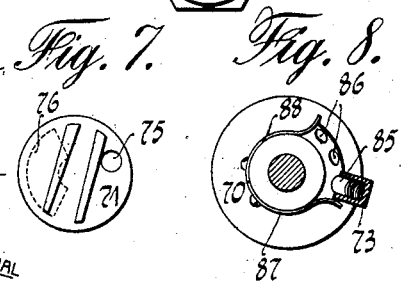
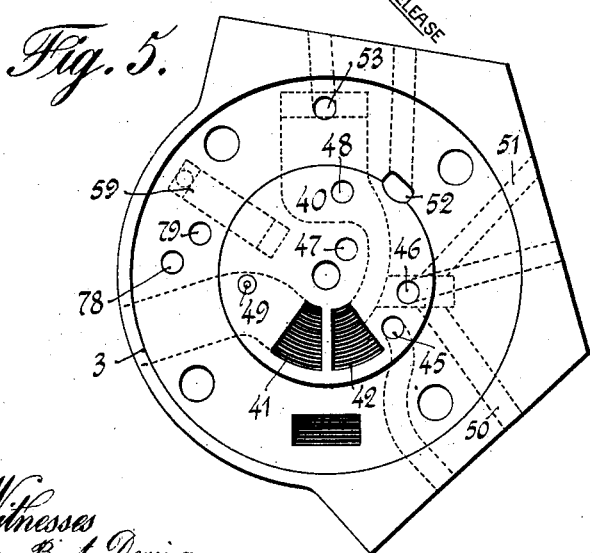
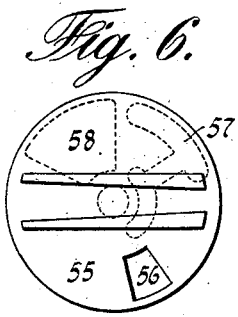
Witnesses
Max B. A. Doring.
M. C. Skelley
Inventor
Murray Corrington No. 762,282. PATENTED JUNE 14, 1904.
M. CORRINGTON.
FLUID PRESSURE BRAKE APPARATUS.
APPLICATION FILED SEPT. 28, 1903.
NO MODEL. 4 SHEETS—SHEET 3.
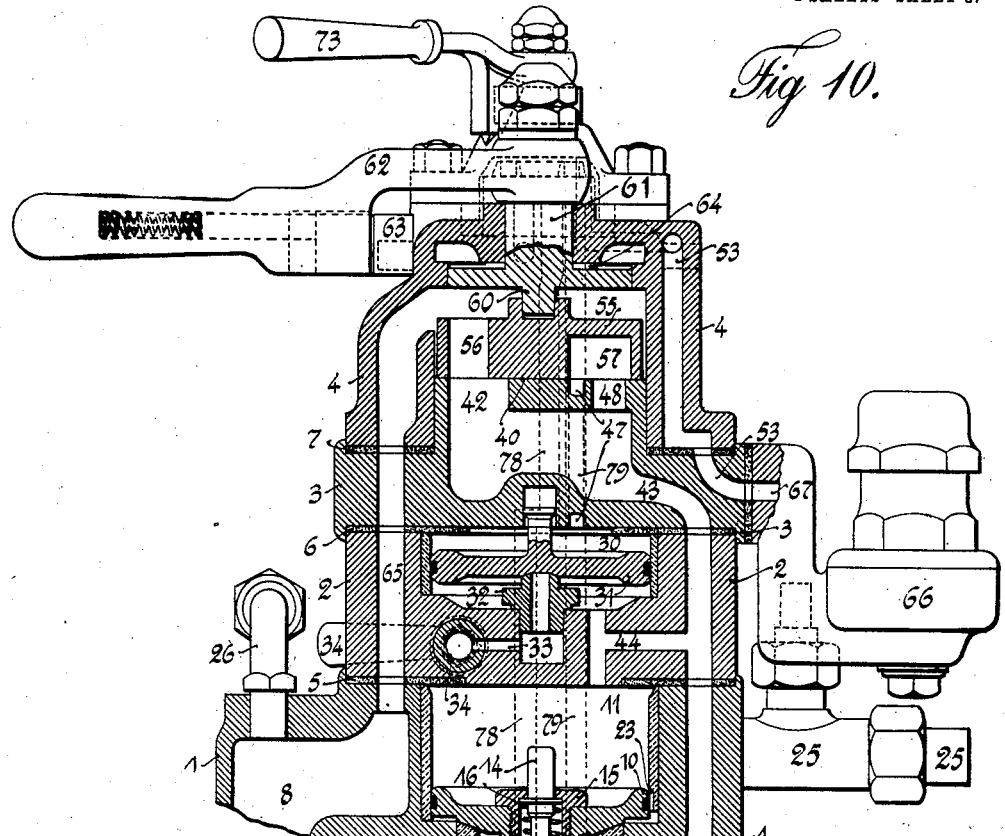
Fig. 10.
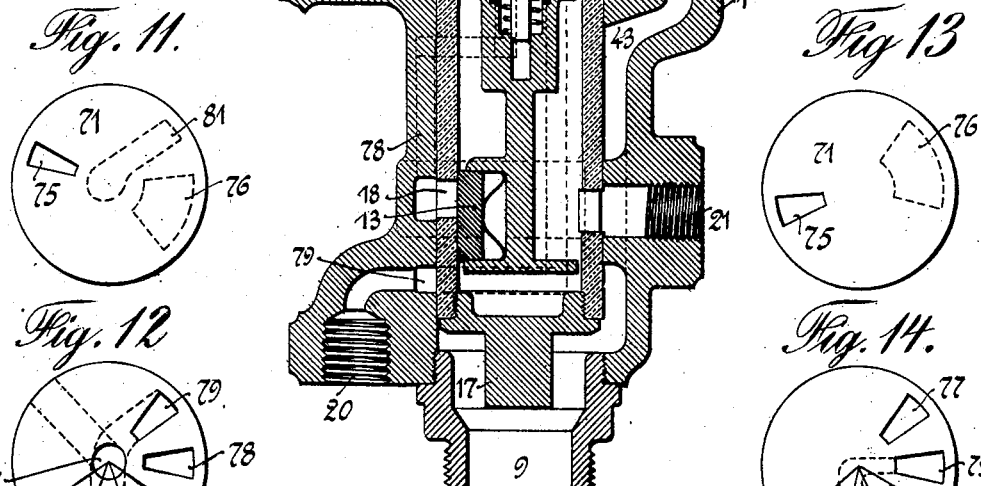
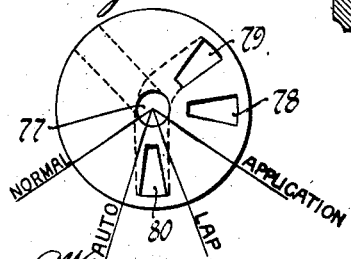
Fig. 11.
Fig. 12.
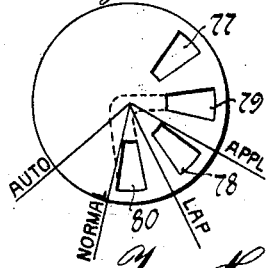
Fig. 13.
Fig. 14.
Witnesses
Max B. A. Doring.
M. C. Skelley.
Inventor
Murray Corrington

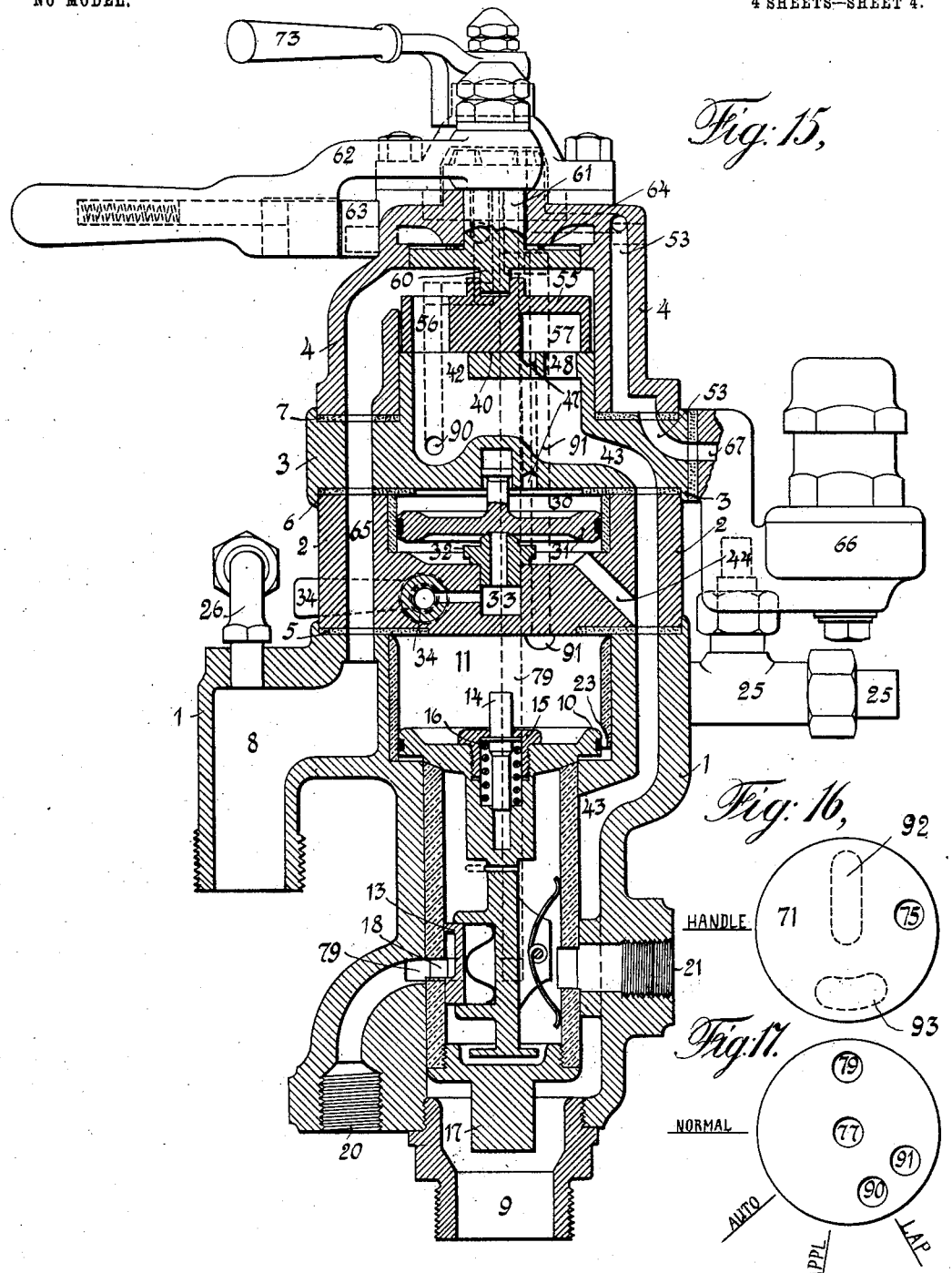

No. 762,282. Patented June 14, 1904.

UNITED STATES PATENT OFFICE.

MURRAY CORRINGTON, OF NEW YORK, N. Y.

FLUID-PRESSURE BRAKE APPARATUS.

SPECIFICATION forming part of Letters Patent No. 762,282, dated June 14, 1904.

Application filed September 28, 1903. Serial No. 174,946. (No model.)

*To all whom it may concern:*

Be it known that I, MURRAY CORRINGTON, a citizen of the United States, residing at New York city, in the county and State of New York, have invented certain new and useful Improvements in Fluid-Pressure Brake Apparatus, of which the following is a specification.

My invention relates to improvements in fluid-pressure brake mechanism, and has for its object more particularly the better control of railway-vehicles by enabling an engineer to hold his train under a more certain and continuous brake control than is feasible with the existing brake systems.

It is intended to describe and claim herein, broadly, mechanism for accomplishing the results set forth, to which the apparatus described in my application heretofore filed and that described in another application to be filed are subordinate.

Referring to the drawings, Figure 1 is a vertical section through a valve mechanism embodying my improvements. Fig. 2 is a sectional view of the upper casing-section and its operative parts on the line, essentially, A B of Fig. 3. Fig. 3 is a top or plan view of Fig. 2 on the line C D. Fig. 4 is a sectional view on the line E F of Fig. 1 looking downward. Fig. 5 is a top or plan view of casing-section 3 and the large rotary valve-seat of Fig. 1. Fig. 6 is a top view of the rotary valve which operates on said seat. Fig. 7 is a plan view of the small rotary valve which operates on the corresponding seat seen in Fig. 3. Fig. 8 is a detail, being a top view of a portion of Fig. 2 on the line G H. Figs. 9 to 17 represent modifications fully explained hereinbelow.

Referring to Fig. 1, the general construction consists of casing-sections 1, 2, 3, and 4, with gaskets 5, 6, and 7 interposed between sections 1 and 2, 2 and 3, and 3 and 4, respectively. Section 1 of the casing has a nozzle 8 for connection with the main reservoir or air-pump and a hollow cap or plug 9 for connection with the brake-pipe of the system. A piston 10 moves in a chamber 11 and operates a main valve 12 and a smaller or graduating valve 13. Within the piston 10 a stem 14 is secured in place by a screw-cap 15 and is held in the position shown by the spring 16. A cap 17 closes communication between the chamber in which the piston 10 and valve 12 operate and the train-pipe connection 9. The valve 12 has a D-cavity, which normally connects ports 18 and 19, which will be more fully described hereinafter. The casing 1 has two ports 20 and 21, which are to be connected, respectively, with one or more brake-cylinders and one or more auxiliary reservoirs. The passage 20 may be controlled by a cock 24.

Considering sections 2 and 3, with reference more particularly to Figs. 1, 5, and 6, section 2 embraces a piston-chamber 30, in which operates a piston 31, whose under side rests normally upon a valve 32, held in fixed relationship to the casing-section and having a port or passage 33 leading to the atmosphere through cock 34. When this cock is at right angles to the position shown, it closes port 33. Section 3 has a seat 40, through which extends a large port 41, leading out to the atmosphere, as shown in dotted lines, Fig. 5, and a large train-pipe port 42, leading to the right and downward, Fig. 1, and thence by passage 43 through casing-sections 2 and 1 and the cap 9 to the train-pipe. A branch passage 44 leads off from 43 and dividing admits train-pipe pressure to the under side of piston 31 and to chamber 11. From the valve-seat 40, Fig. 5, the ports 45 46 extend downward and to the outer edge of the casing, as seen in dotted lines. A port 47 leads from said valve-seat to the upper end of piston-chamber 30, Fig 1. A port 48 leads from said seat downward into the train-pipe cavity 42 43, and a small port 49 leads from said valve-seat into the large exhaust-cavity 41. From the side of the casing to which the passage 45 extends a passage 50 leads into the train-pipe cavity 42 43, and from the side to which the passage 46 extends a passage 51 likewise leads to the train-pipe cavity. All these passages are shown in dotted lines in Fig. 5. A passage 52, preferably open to pressure from the main reservoir or pump, leads to the outside of the casing, and from the same side of the casing a passage 53 leads upward to the top of casing-section 4, as seen in Fig. 1.

Fig. 6 shows the rotary valve 55, which is to be moved to the left and placed in position upon the valve-seat 40, the central hole in the seat 40 accommodating a corresponding pin on the under side of the valve 55, so as to keep it concentric with its seat. Said valve has a port 56 through it, a cavity 57, consisting of connected inner and outer arcs or curved portions, and a cavity 58 on its under side, as shown in dotted lines. On the top of said valve is the usual slot or mortise, wider at one end than at the other, into which a correspondingly-shaped key 60 fits accurately (see Fig. 1) for operating the same. A cavity or passage 59 is cored from the under side of casing-section 3 in such manner that one end of said passage communicates with the upper end of piston-chamber 30, while the other end leads downward through casing-section 2 and communicates with a corresponding passage in casing-section 1 and thence by the pipe or passage 25 to the usual equalizing-reservoir. It is not deemed necessary to further illustrate said passage 59 than as seen in Fig. 5, since it is the well-known construction familiar to those skilled in the art for keeping the upper end of the equalizing piston-chamber 30 open to an equalizing-reservoir. The pipe 26, Fig. 1, is for the usual gage connection.

Casing-section 4 incloses the rotary valve 55, and through its center a shaft 61 extends, having at its lower portion a key 60 and at its upper end the handle 62 for operating said shaft, and thereby the rotary valve 55, all arranged in the usual manner. A spring-stop 63 is carried by the handle 62 and is arranged to hold the handle in the various positions to which it is moved in operating the valve 55. A gasket 64 prevents air from leaking out around the shaft 61. It is to be understood that pressure from the main reservoir or pump flows by the nozzle 8 and the passage 65 and is always present above the valve 55. Within the casing-section 4 is also located a chamber which is inclosed by the cap-section 70, Fig. 2, within which a small valve 71 is operated by a shaft 72, extending through the casing 70, by means of a handle 73, the whole arrangement being essentially similar to that for operating the valve 55 by means of the handle 62 and the shaft 61, a gasket 74 also preventing air from leaking around the shaft 72.

Going to Fig. 5, it is to be understood that the passages 45 and 50 are so arranged that a pressure-reducing-valve device may be attached to the casing-section, so that fluid under pressure may be admitted into the passage 45, whence it will flow to the outer section of the casing and through the pressure-reducing-valve device and thence by the passage 50 into the train-pipe chamber and passage 42 43. This is for the purpose, known to all skilled in the air-brake art, of keeping the train-pipe pressure regulated at a definite amount even though the pressure in the main reservoir may vary. The passages 46 and 51 are similarly arranged for another pressure-reducing valve on that side of the casing-section. The passages 52 and 53 in Fig. 5 are arranged for a similar reducing-valve, the main difference being that ports 45 and 46 are intended to be open to main-reservoir pressure only when the valve 55 is turned to such position that the port 56 stands over one or the other of said ports, while it is preferred that port 52, being at the side of the rotary seat, shall be always open to whatever pressure there may be in the passage 65. In Fig. 1, at the right, is shown in outline a pressure-reducing device 66 occupying the proper position for controlling the ports 52 and 53, that section of the device into which the passage 52 would enter, as well as the passage itself, being cut away. It is to be understood that with this pressure-reducing device in position air from the main reservoir or pump going through passage 52 and the reducing device 66 is reduced to a pressure corresponding to the adjustment of the device and thence flows by the passage 67 into the passage 53. I do not deem it necessary to illustrate or describe more fully a pressure-reducing valve, since it is thoroughly understood in the air-brake art, as well as in mechanics, and it is to be understood that any other suitable device through which fluid under a higher pressure can be delivered into a passage or chamber at such lower pressure as is desired and that lower pressure constantly maintained will answer equally well. The passage 53 leads upward through casing-section 4, (see Fig. 1,) then through the casing-section, as seen in dotted lines, Fig. 3, and upward until it reaches the chamber in which the valve 71 operates, so that the fluid under pressure coming through the passage is always present above the valve 71. The valve 71 has a port 75 through it and a cavity 76 on its under surface. (Seen in dotted lines, Fig. 7.) The seat on which said valve operates has a port 77, leading downward and out to the atmosphere, Figs. 2 and 3, and two ports or passages 78 and 79, which go downward through casing-section 4, (seen in dotted lines, Fig. 2,) thence through casing-sections 3, 2, and 1 until they are placed in communication, respectively, with ports 19 and 18. These two passages 78 and 79 can be easily traced in dotted lines in Fig. 1. Suffice it to say that passage 78, leaving the seat of valve 71 in Fig. 3, may be carried in any convenient manner, but preferably through the various casing-sections, until it is placed in communication with the port 19, and passage 79 from the same valve-seat in Fig. 3 may be carried in any convenient manner, preferably through the casing-sections, until it is placed in communication with the port 18 and passage 20.

The operation of the mechanism can now be readily understood. Fluid under pressure from the main reservoir or air-pump being supplied to the nozzle 8 flows upward through passage 65 into the chamber around and above the rotary valve 55, through the passage 52 into the pressure-reducing valve 66, and thence through the passage 53, Figs. 1 and 3, into the chamber above the small valve 71. The position of valve 55 in Fig. 1 is what is known as the "release" position, in which pressure from the main reservoir flows downward through port 56 into train-pipe port 42, thence by passage 43 and the train-pipe nozzle 9 to the train-pipe of the brake system and the various triple valves on the cars. This pressure from the train-pipe likewise goes by the passage 44 to the under side of the piston 31 and into the upper end of a piston-chamber 11, where it forces the piston 10 and its connected parts into normal position, (seen in Fig. 1,) in which the port 23 is opened, allowing the pressure to go past the piston into the valve-chamber and thence by the passage 21 to charge the auxiliary reservoir connected therewith. At the same time the train-pipe pressure in chamber 42 43 flows by port 48 into cavity 57, Fig. 6, and thence through 47 to the upper side of the piston 31, thereby keeping said piston normally balanced and held in the position shown in Fig. 1. Fig. 9 shows an additional port 27, which is uncovered by the piston 10 when in normal position for charging air from train-pipe to auxiliary reservoir by way of passage 29 past the check-valve 28. This port may be employed, if desired, either with the groove 23 or independently thereof.

The handle 62, which operates the valve 55, has six different positions into which it may be moved. In position No. 1 the port 56 stands over the large train-pipe port 42, which has just been described. In position No. 2 the port 56 stands over the port 45, thus admitting pressure through the passage 45 and its appropriate pressure-reducing valve, thence by the passage 50 into the train-pipe. In position No. 3 the port 56 stands over the port 46, when the pressure flows through the last-mentioned port and the appropriate pressure-reducing valve and thence by the passage 51 into the train-pipe. In all three of these positions the train-pipe cavity is kept in communication with the upper end of the piston-chamber 30 by means of port 48, the cavity 57, and the passage 47. In position No. 4 the port 56 passes beyond the port 46, while the outer arc of the cavity 57 stands between the ports 48 and 49 in the valve-seat. This is known as "lap" position of the brake-valve, in which all ports are closed. In position No. 5 the valve is turned just far enough to bring the outer arc of the cavity 57 over the preliminary exhaust-port 49, while the inner arc of the cavity remains over the port 47, thus releasing, through a small port, pressure from the upper side of the piston 31 and the equalizing-reservoir. Five or ten pounds having been exhausted from the upper side of the piston 31, the brake-valve is returned to lap, when the train-pipe pressure underneath the piston lifts it from the valve 32 and flows to the atmosphere through the passage 33 until the pressure below the piston is slightly less than that above, when the piston moves down gradually and closes the port 33. This is known as the usual "service" application of the brakes, the piston 31 performing the regular functions of an equalizing-piston. In position No. 6, known as the "emergency" position, the cavity 58 connects the large ports 41 and 42, thus exhausting the air rapidly from the train-pipe directly to the atmosphere and causing the emergency operation of the triple valves on the train.

The rotary valve 55, with the handle 62, the rotary valve-seat and piston 31, and connected parts embraced in casing-sections 2 and 3, including the pressure-reducing devices for controlling the pressure admitted through passages 45 50 and 46 51, constitute an engineer's brake-valve, essentially the same as illustrated in United States Letters Patent No. 729,044, issued to me May 26, 1903.

The valve 71 may be operated by its handle 73 into any one of four positions, in which the handle will stand essentially on the lines marked in Fig. 3, respectively, "Release," "Normal," "Lap," and "Application." If the valve seen in Fig. 7 were moved to the right and set down upon its seat in Fig. 3, the handle 73 of the valve would occupy the position marked "Normal," in which position the cavity 76 on the face of the valve connects ports 77 and 78. When the handle is turned to the position marked "Lap," the ports 77 and 78 are disconnected, and in this position the port 75 through the valve stands at the right of the port 79. When the valve is turned to the position marked "application," the port 75 stands over and admits pressure through the port or passage 79, thence to the brake-cylinders through passage 20. When the valve is turned to the position marked "Release," the cavity 76 connects ports 79 and 77.

In the operation of the valve 55 and the equalizing-piston 31 for setting the brakes in service the piston 10 moves upward until the stem 14 strikes the bottom of the casing 2, said piston first opening the graduating-valve 13 and then drawing the valve 12 to a position where the port 22 registers with the port 18, thus admitting pressure from auxiliary reservoir, through ports 21, 22, 18, and 20, to the brake-cylinder. In the emergency action the graduating-spring 16 yields, permitting piston 10 to move to the upper end of its chamber and draw the valve 12 clear across port 18. Communication between ports 18 and 19 is cut off when the valve 12 moves to service position. Under ordinary circumstances when this operation is effected by the movement of the brake-valve handle 62 the small valve 71 is in normal position, in which the port or passage 78, and therefore the port 19, are in communication with the exhaust-port 77. If the brakes whose cylinders are connected to the port 20 are to be operated in the usual manner, they may be set with the force desired by the movement of the brake-valve handle 62. To release the brakes, air is admitted into the train-pipe, which moves the piston 10 and valve 12 downward to the position shown, connecting ports 18 and 19, when the air from the brake-cylinder flows through said ports and cavity in the main valve, thence by passage 78, cavity 76 in the valve 71, and the port 77 to the atmosphere, after which the auxiliary reservoir is recharged in the usual manner through the charging-groove 23, the triples on the cars moving to release meanwhile.

If it is desired to hold the engine-brakes on and recharge the auxiliary-reservoir without releasing, the handle 73 is moved to the position designated "Lap," cutting off communication between ports 77 and 78, just before operating the brake-valve handle 62 for release. When the valve 12 moves to release, air from the brake-cylinder flows through the passage 78 to the bottom of the small valve 71; but the port 78 being now closed it can get no farther, so that the reservoir may be recharged while the brakes are held on, and these operations may be repeated, recharging the reservoir, admitting more pressure to the cylinder, and keeping the brakes continuously applied as long as desired without releasing. When it is desired to release, it is only necessary to shift the handle 73 back to normal position, connecting ports 78 and 77 and permitting the pressure to escape from the brake-cylinder.

It will be readily observed that the valve structure herein illustrated is particularly adapted to be placed under the immediate care of and operated directly by the engineer, and it is particularly applicable for controlling the brakes on the engine or on both engine and tender. It is the usual practice in equipping an engine with brakes to employ one triple for driver and truck-brakes and two sets of brake-cylinders and two auxiliary reservoirs. Controlling-cocks are so arranged that when the driver and truck-brakes are both in service both reservoirs are connected to the triple and when but one set of brake-cylinders is in operation only the corresponding auxiliary reservoir is in service. This is all arranged by connecting a single reservoir-pipe to the nozzle corresponding to 21 and a single brake-cylinder pipe to the nozzle corresponding to 20. By a similar arrangement I propose where desirable to add an extra reservoir to be employed with the usual brake-cylinder for the tender and so arrange the pipes that when the tender-brake is to be operated directly from the valve device herein illustrated its appropriate reservoir shall be likewise cut in. The device herein illustrated may therefore be employed to operate both the engine and tender brakes, or it may be employed to operate the engine-brakes only, allowing the tender-brakes to be operated in the usual manner. In any event I prefer that the triples on the cars shall be connected to the train-pipe by the usual branch-pipe connections in the ordinary manner, though it is evident that the cylinders of one or more cars may be connected to port 20 as described above with reference to the tender.

From the above description of the operation of the apparatus it is evident that I may operate the mechanism so that the brakes on the engine may be released either at the time the brakes on the cars are released for recharging the reservoirs or the brakes on the cars may be released before recharging, while the brakes on the engine may be released after recharging the reservoir. This is all accomplished by the movement of the handle 73. In case it is desired to set the brakes on the engine without applying on the cars the handle 73 is moved to application position without operating the brake-valve handle 62, which would of course be normally in one of the running positions in which the port 56 stands over either port 45 or port 46. In application position of the valve 71 the pressure entering the valve-chamber through the passage 53 passes downward through the port 75 in the valve into the passage 79 and thence by passage 20 to the brake-cylinder. At the same time the pressure thus admitted into 79 flows by port 18, the cavity in the main valve 12, ports 19 and 78 against the valve 71; but as the port 78 is closed no air can escape. Having admitted the amount of pressure desired in the brake-cylinder, the valve-handle 73 is moved back to the position marked "Lap," preventing any flow of air either to or from the cylinder.

If the valve 71 is left in application position, air from the main reservoir continues to flow through passages 52, the reducing-valve 66, the passage 53, and ports 75, 79, and 20 until the pressure in the brake-cylinder is as great as that which will be admitted by the reducing-valve 66, which for convenience I shall assume to be fifty pounds per square inch. Should the engineer admit more pressure than desired and wish to reduce the pressure, he shifts the handle 73 for an instant back to normal position, thus connecting ports 77 and 78 through the cavity 76 and releasing the pressure from the brake-cylinder through ports 20 18, cavity in valve 12 19 78 76 77 to the atmosphere. By moving the handle 73 between application, lap, and normal positions the pressure may be admitted to and released from the brake-cylinder or held at any pressure desired from one pound up to the full maximum permitted by the reducing-valve 66.

In case the brakes are set in the usual manner throughout the train by operation of the brake-valve handle 62 it may be desirable to accomplish any one of the several results with the engine-brakes either to increase the pressure in the engine-cylinders or to reduce the pressure or to take the brakes off entirely. After such operation of course the port 22 registers with the port 18, while communication between ports 18 and 19 is closed. Should the engineer desire to increase the pressure in the engine-cylinders, he moves the handle 73 to application position, admitting air directly down through the ports 75, 79, and 20 to the cylinder, or should he desire to reduce the pressure in the cylinders or release brakes entirely on the engine he moves the valve-handle 73 into position marked "Release," when the air from the cylinder flows through the passage 79, cavity 76, and port 77 to the atmosphere. The engineer is therefore at liberty with the brakes set throughout the train to vary the pressure in the brake-cylinders on the engine at will or release those brakes entirely without affecting the brakes on the cars. As already explained, the valve 71 being placed in lap position closes communication to and from the brake-cylinders and simply retains the pressure therein, and consequently there can be no undesired release through the accidental movement of piston 10 to normal position.

In case of leaks from the engine-cylinders the pressure can be fully restored by moving the valve 71 to application position.

Fig. 8 is a detail of a portion of the cap 70 and handle 73, in which are shown a spring-pressed stop 85 and appropriate holes or depressions 86 for the stop to enter when the handle is moved to one or the other of its respective positions. The handle 73 is shown in Fig. 8 in position marked "normal," at which time it may touch a spring 87, the arrangement being such that when the handle is moved to position marked "Release" the spring 87 is compressed and has sufficient strength to automatically return the valve to normal position as soon as the engineer lets go. In application position the handle may bear against a similar spring 88, in which position the port 75 preferably opens about one-fourth to one-half of port 79 and admits pressure to the cylinder slowly. By moving the valve farther around the spring is compressed, port 75 fully opens 79, and pressure is admitted rapidly to the cylinder.

To admit and release pressure to and from the cylinder, we may omit passage 78 from the structure and connect port 75 with port 79 for admission of pressure to the cylinders and connect port 79 with exhaust 77 through cavity 76 for release. In such event we may also omit port 19 and the D-cavity in valve 12, and, indeed, may leave out valve 12 and employ a graduating-valve only to control port 18, similar to that employed in Fig. 10.

With my apparatus herein described on the second of two engines, the brakes on the train being controlled from the head-engine, the handle 62 is placed on lap position and the cock 34 turned to close port 33.

In the mechanism illustrated in Figs. 1 to 9, inclusive, the arrangement of the parts is such that whenever the valve-handle 62 is operated for automatic application of the brakes the piston 10 and valves operated thereby are shifted to the position for opening the port 18, and consequently the engine-brakes will always be applied on each reduction of pressure in the train-pipe, and hence any accidental bursting of the train-pipe or breaking in two of the train will certainly apply the brakes throughout the train, which may by many be considered an advantage. With the apparatus operating in this manner, in order to set in motion the alternate system of application and release between engine and cars above described the engineer first applies brakes throughout the train by operating the handle 62, then operates the handle 73 to release, and holds engine-brakes at release until the time arrives for releasing and recharging on the cars, when he applies on the engine by moving handle 73 to application position and releases on the cars, &c. Some may prefer to set this alternate plan of application and release in operation by first applying brakes on the cars without applying on the engine. One way to accomplish this is to remove the spring 87 (seen in Fig. 8) and allow the handle 73 to stand in release instead of normal position while operating the automatic brake-valve to apply brakes. In such event the triples on the cars move to application position, and the piston 10, Fig. 1, likewise moves so as to admit pressure from reservoir through 18 into 79 and 20; but as the cavity 76 now connects port 79 with exhaust 77 the air thus admitted from the reservoir through 18 passes through 79, 76, and 77 to atmosphere, so that there is no application of the engine-brakes. When it is desired to apply on the engine in order to release and recharge on the cars the handle 73 is shifted to application position, with the results already described.

Another means for preventing the application of the engine-brakes while automatically applying on the cars is provided by the cock 24, controlling the brake-cylinder passage 20. By closing this cock the engineer applies throughout the train by operating the automatic brake-valve in the usual manner and shifts the piston 10, as before, to admit pressure through the port 18 into 20; but said pressure gets no farther than the cock 24. We are supposing that the small valve 71 stands in position marked "normal." When the engineer wishes to apply on the engine and release on the cars for recharging, he places the brake-valve handle 62 in released position, opens the cock 24, and moves the handle 73 of the small valve to application position, with the results already explained.

Figs. 10 to 14, which show modifications and simplifications of the apparatus illustrated in the preceding figures, are arranged herein so that the engineer may set the alternate plan of application and release in operation by first applying brakes on the cars without applying on the engine. In Fig. 10 it will be observed that the port 19, as well as the main valve 12, is left entirely out of the structure. Passage 78 from the valve-seat, Figs. 12 and 14, communicates with the port 18 instead of with the port 19, as in Fig. 1, while passage 79 leads from the valve-seat to the brake-cylinder passage 20, but is not connected with the port 18. A single small and preferably slide valve 13 is operated by the piston 10 to perform the graduating function of controlling the admission of pressure from reservoir to cylinder; but the reference-numeral 13 is retained because it performs, essentially, the same function as the valve 13 of Fig. 1. I prefer that the movement of the valve 13 shall be so arranged that in service action it shall uncover only a part of port 18, but in emergency it shall fully open said port.

Figs. 11 and 12 show top or plan views of a modification of the small valve 71 and its seat. The valve 71 has the port 75 through it and the two cavities 76 and 81 (seen in dotted lines) on its under side. The valve-seat 12 has an exhaust-port 77 in its center, which passes downward and then out to the left, as seen in dotted lines, the two ports or passages 78 and 79 leading downward into communication, respectively, with ports 18 and 20, and the port 80, which goes downward and thence by a cored passage underneath the exhaust-passage 77 into the passage 79. The valve 71 is to be moved directly downward and placed upon its valve-seat with the handle of the valve standing in position marked "normal," at which time the cavity 81 connects port 79 with passage 77, so that the brake-cylinder is at exhaust. If the train-pipe pressure is now reduced to apply brakes, the piston 10 moves upward and causes the valve 13 to open port 18 and admit pressure through the passage 78 into cavity 76 of the valve; but as this cavity is not connected with any other port the pressure thus admitted gets no farther. The brakes are of course applied on the cars by this operation without being applied on the engine.

If it is desired to place the mechanism in such relationship that the brakes will apply automatically on cars and engine at the same time, the handle 73 is moved to the position marked "Auto," at which time the cavity 76 connects ports 78 and 79, so that on working the brake-valve handle the pressure admitted through the port 18 flows through passages 78, 76, 79, and 20 to the cylinder and applies the brakes. When it is desired to apply the brakes on the engine and release and recharge on the cars, the engineer operates the brake-valve handle 62 in the usual manner for release and moves the handle 73 to the position marked "Application," causing ports 75 to open 80 and admit pressure to the cylinder through ports 75, 80, and 79. When the handle 73 is in position marked "Lap," all ports are closed.

Figs. 13 and 14 are top views of the valve 71 and its seat, showing a slightly different arrangement of ports for accomplishing the same results. The valve of Fig. 13 being moved downward and placed in position upon the seat of Fig. 14, with the handle standing in position marked "Normal," the cavity 76 connects ports 79 and 77, so that the brake-cylinders are at exhaust, while the valve closes port 78. If, therefore, the brakes are automatically applied throughout the train, the piston 10 moves up, as already explained, and opens the port 18, filling the passage 78 with pressure, which passage is, however, closed by the valve 71, thus preventing application of the engine-brakes. When the engineer desires to apply the engine-brakes automatically at the same time that he applies on the cars, he shifts the handle 73 to position marked "Auto," when the cavity 76 connects ports 78 and 79, thus admitting pressure to the cylinder through ports 18, 78, 76, 79, and 20. When it is desired to apply brakes on the engine and release and recharge on the cars, he operates the brake-valve handle 62 in the usual manner for release and shifts the handle 73 to the position marked "Application," at which time the port 75 opens the port 80, admitting pressure through 80 into 79, as already explained with reference to Fig. 12, and thence to the brake-cylinders. As in the other figures, when the valve is in the position marked "Lap" all ports are closed. It will be observed that in all conditions of service any pressure that has been admitted to the engine-cylinders may be released wholly or partly by moving the valve 71 to normal position, since in this position the cavity 81 of Fig. 11 and the cavity 76 of Fig. 13 connect ports 79, leading to the brake-cylinder, with exhaust 77.

Fig. 15 illustrates still another means of enabling the engineer, if he desires, to apply the brakes on the cars without applying on the engine. In all the figures heretofore described the chamber 11 is freely open to the train-pipe at all times, and therefore the piston 10 moves to application and back to normal positions with each decrease and increase, respectively, of the train-pipe pressure. In Fig. 15, however, the chamber 11 does not connect directly with the train-pipe. A passage 90 leads from the train-pipe up to the small rotary valve-seat, Fig. 17, while another passage 91 leads from the valve-seat downward into the chamber 11. The valve 71 of Fig. 16 is to be moved directly downward and placed upon the valve-seat of Fig. 17, the handle occupying the position marked "normal." In this position of the valve the cavity 92 connects port 79, leading to the brake-cylinder through 20 with exhaust-port 77, thus keeping the engine-cylinders normally at exhaust.

Should the engineer desire to apply the brakes on the engine at the same time that he applies brakes on the cars, he moves the handle of the small valve to the position marked "Auto," when 92 passes to the left of 79, thus closing the engine-cylinders to exhaust, while cavity 93 on the face of the valve 71 connects ports 90 and 91, thus placing chamber 11 in free communication with the train-pipe through passages 91, 93, and 90. The piston 10 now performs its usual functions, according as the train-pipe pressure is decreased or increased. When the engineer wishes to increase pressure in the engine-cylinders, he moves his small valve-handle 73 to the position marked "Appl.," or application position, when the port 75 in valve 71 registers with the port 79, leading down to the brake-cylinder, thus permitting the admission to the engine-cylinders of any desired amount of pressure. The valve being moved to position marked "Lap," all ports are closed. It will be observed that the engineer has absolute control of the pressure in the engine-cylinders wholly independently of whether the brake-valve handle 62 has been operated to apply or to release brakes, since if he desires to increase pressure in the cylinders he shifts the small valve-handle 73 to application position and causes port 75 to register with port 79, when pressure will flow into the cylinders, while if he wishes to reduce the pressure already in the cylinders he shifts the valve-handle to normal position when cavity 92 connects port 79 from the brake-cylinders with exhaust 77. By moving to "Lap" the pressure in the cylinders may be retained at any amount desired. It will be observed that what has been said concerning the engineer's ability to control the pressure in the engine-cylinders applies with equal force throughout all the figures of the drawings. At all times and under all circumstances the engineer has complete control of the pressure in the engine-brake cylinders by reason of the free and open passage 79, with which nothing in the whole valve structure is permitted to interfere, being placed under control of the valve 71, permitting either the admission or exhaust of pressure to or from the cylinders or its retention at any desired amount, according as the valve 71 is moved to "Application," release, or "Lap." In one or more instances the release position is designated on the drawings as "Normal." The engineer has perfect control over the valve 71 and all the functions it performs through the small handle 73. While I have constructed Fig. 15 with the single small valve 13 and port 18, omitting passage 78, it is evident that I might construct it similar to Fig. 1, employing the main valve 12, the port 19, and the passage 78, in which case the latter might lead from the port 19 to the valve-seat of Fig. 17 immediately between ports 77 and 79.

While I have described the above mechanism with reference more particularly to its application upon an engine and a new manner of operating the engine-brakes, either separately or in combination with the brake apparatus upon a railway-car, I do not limit its use to what is usually understood as a steam engine or locomotive, because it is apparent that it may be placed upon any car or other vehicle which is used to carry either freight or passengers and which carries its own motor—as, for instance, an electrical motor or trolley-car. In the within specification and claims therefore whenever I speak of applying and releasing brakes on an engine I mean, broadly, any engine, locomotive, or motor which is used either for self-propulsion or for the purpose of drawing any other car or vehicle, and I propose to employ the within-described apparatus and its double method of applying and releasing brakes either for the purpose of controlling such engine or motor alone or in combination with any car or vehicle which such engine or motor is hauling.

From what I have said above it is apparent that my apparatus herein illustrated and described is capable of operation as an engine-brake system in connection with the regular automatic-brake system upon the cars in either of the following manners:

First. It may be operated merely as part of the regular automatic-brake system, setting the brakes on the engine at the same time they are set upon the cars and releasing on the engine and cars at the same time before recharging the reservoirs.

Second. The engine-brakes may be operated to apply at the same time that brakes are applied on the cars, then held in application while the auxiliary reservoir on the engine is recharged, while brakes on the cars are released and reservoirs recharged.

Third. The brakes on the engine may be applied and the pressure varied up or down at will without applying brakes on any of the cars. This may often happen to be very advantageous in switching or when it is desired to steady the train without waste of time or of air involved in applying and releasing throughout the train by movement of the handle 62.

Fourth. The brakes may be set on engine and cars and then the pressure in the engine-cylinders either held constant or increased or reduced at will while holding the brakes applied on the cars.

Fifth. The brakes may be applied on engine and cars alternately, holding them on the engine while releasing and recharging on the cars and then, after reapplying on the cars, either reducing the pressure on the engine-brakes to the minimum or releasing on the engine entirely. This will doubtless be of great advantage for controlling the train, particularly on a grade where the brakes may be applied throughout the train, then released on the engine until the time comes for recharging reservoirs when the brakes may be set upon the engine with the maximum force permitted while the brakes are released and the reservoirs recharged upon the cars, when, after reapplying on the cars, the engine-brakes may be again released until the time arrives for the next recharging on the cars. This alternate operation of the engine-brakes and the car-brakes, particularly on a grade, will allow the train to be held under continuous brake-control without risk of over-heating the wheels either on the engine or on the cars.

I count it one of the principal features of my apparatus in connection with the standard apparatus on the cars that I produce an alternate brake system capable of operating either conjointly or alternately between engine and cars, holding engine-brakes on while releasing and recharging on cars, and then while holding brakes applied on the cars releasing on the engine.

I claim—

1. In a fluid-pressure brake system, the combination, with a train-pipe normally charged with pressure, of apparatus on an engine and apparatus on a car capable of operation by a reduction of train-pipe pressure to apply brakes and means under control of the engineer for alternately holding brakes applied on the engine while releasing brakes on the car, and vice versa.

2. In a fluid-pressure brake system, the combination of mechanism on a car and mechanism on an engine automatically operative to apply brakes on a reduction of pressure in a train-pipe, and mechanism under control of the engineer for, at one time, alternately releasing brakes on the engine while holding brakes applied on the car, and vice versa, and, at another time, applying and releasing brakes conjointly on the engine and car.

3. The combination, with a brake-cylinder, an auxiliary reservoir and a triple valve, on a car, of a brake-cylinder, an auxiliary reservoir and a valve device automatically operative to apply brakes, on an engine, and a valve mechanism capable of operation by the engineer for controlling said apparatus on car and engine, and for applying and releasing brakes, at one time alternately and at another time conjointly between engine and car.

4. In a fluid-pressure brake system, the combination, with a triple valve and a brake-cylinder on a car, a valve device automatically operative to apply brakes and a brake-cylinder on an engine, of means under control of the engineer for alternately releasing the brakes on the engine while the brakes on the car are set, and for holding brakes applied on the engine while releasing on the car.

5. In a fluid-pressure brake system, the combination, with a triple valve and a brake-cylinder on a car, a valve device automatically operative to apply brakes and a brake-cylinder on an engine, of means capable of control by the engineer for operating said triple and automatic valve device to application and release or normal positions and similarly-controlled means, independent of the movement of the engine-valve device, for alternately releasing and applying brakes on the engine while the triple on the car is, respectively, in positions for applying and for releasing brakes.

6. In a fluid-pressure brake system, the combination, with a triple valve on a car and a triple valve on an engine of means capable of operation by the engineer for moving both triples to application position and a similarly-controlled supplemental valve for releasing brakes on the engine, independently of the movement of either triple, through a passage leading from the cylinder to said valve.

7. In a fluid-pressure brake system, the combination of an automatic valve device operative by a reduction of pressure in a brake-pipe to admit pressure into a brake-cylinder, an unobstructed passage leading to said cylinder, which is independent of said automatic valve device, and means operated by the engineer for admitting pressure to the cylinder through said passage and for controlling said pressure after its admission independently of the position of said automatic valve device.

8. In a fluid-pressure brake system, the combination, with a brake-cylinder and a valve device automatically operative to apply brakes, of a valve-seat, a free and unobstructed passage leading from said valve-seat to said cylinder and a valve capable of operation by the engineer and independent of the brake-valve proper for controlling the flow of pressure through said passage and at the same time controlling all exits from said cylinder, whereby any desired pressure may at any time be admitted to said cylinder and maintained or increased or decreased at will.

9. The combination, with a valve device controlling the admission of pressure from an auxiliary reservoir to a brake-cylinder, of means capable of control by the engineer and including a passage independent of the movement of said valve device, for admitting pressure to and exhausting it from the cylinder and an unobstructed passage from said valve device to the cylinder which may always be opened instantly said valve device moves to application position.

10. The combination, with a valve device controlling an admission-passage to and an exhaust-passage from a brake-cylinder, a valve, independent of the brake-valve proper, capable of operation by the engineer for closing said exhaust-passage, a passage controlled by said valve for admitting pressure to said cylinder and an unobstructed passage from said valve device to said cylinder, which may always be opened instantly said valve device moves to application position.

11. The combination, with a valve device and a brake-cylinder, of a valve-seat, means of communication from the valve-seat to the exhaust-passage of said valve device and to the brake-cylinder, and a valve, independent of the brake-valve proper, operating on said seat for controlling such communication so that its movement may cause admission of pressure to said cylinder, and at the same time close said exhaust-passage.

12. The combination, with a valve device for applying and releasing brakes and a brake-cylinder, of a valve-seat through which one current of pressure flows to the brake-cylinder and another from the exhaust-passage of said valve device and a valve independent of the brake-valve proper working on said seat, capable of operation by the engineer, for alternately opening one current and closing the other, and vice versa.

13. The combination, with a valve device and a brake-cylinder, of a valve-seat through which one current of pressure flows to the brake-cylinder and another from the exhaust-passage of said valve device and a valve, independent of the brake-valve proper, working on said seat, capable of operation by the engineer to either of three positions, first, for opening the first of said currents while closing the second, second, for opening the second while closing the first, and third, for closing both of said currents.

14. The combination, with a valve device controlling an admission and an exhaust passage to and from a brake-cylinder, a valve-seat and a valve operating thereon and controlling said exhaust-passage leading to said valve-seat, whereby the engineer may govern the release of the brakes independently of the position of the said valve device and cause the recharging of the auxiliary reservoir either before or after release.

MURRAY CORRINGTON.

Witnesses:
M. C. SKELLEY,
OTTO MUNK.